United States Patent
Schmid et al.

(10) Patent No.: US 11,104,081 B2
(45) Date of Patent: Aug. 31, 2021

(54) DEVICE FOR ACCOMMODATING AN ADHESIVE APPLICATION UNIT AND METHOD

(71) Applicant: HOMAG GmbH, Schopfloch (DE)

(72) Inventors: Johannes Schmid, Starzach-Wachendorf (DE); Frieder Goetz, Schiltach (DE); Jonas Danner, Dornhan (DE)

(73) Assignee: HOMAG GmbH, Schopfloch (DE)

( * ) Notice: Subject to any disclaimer, the term of this patent is extended or adjusted under 35 U.S.C. 154(b) by 131 days.

(21) Appl. No.: 15/900,747

(22) Filed: Feb. 20, 2018

(65) Prior Publication Data
US 2018/0237203 A1    Aug. 23, 2018

(30) Foreign Application Priority Data

Feb. 21, 2017   (DE) .......................... 102017202761.4

(51) Int. Cl.

| | |
|---|---|
| *B29C 65/00* | (2006.01) |
| *B29C 65/48* | (2006.01) |
| *B25H 3/02* | (2006.01) |
| *B05B 15/50* | (2018.01) |
| *B25H 3/00* | (2006.01) |
| *B65D 81/20* | (2006.01) |
| *F04F 5/20* | (2006.01) |

(52) U.S. Cl.
CPC ........ *B29C 66/00145* (2013.01); *B05B 15/50* (2018.02); *B25H 3/006* (2013.01); *B25H 3/02* (2013.01); *B29C 66/87* (2013.01); *B65D 81/20* (2013.01); *B29C 65/484* (2013.01); *F04F 5/20* (2013.01)

(58) Field of Classification Search
CPC ............................ B65D 81/20; B65D 81/2038
See application file for complete search history.

(56) References Cited

U.S. PATENT DOCUMENTS

| | | | | |
|---|---|---|---|---|
| 3,703,192 A | * | 11/1972 | Staudacher | ............... B01L 1/02 137/554 |
| 5,913,996 A | * | 6/1999 | Ikegame | ................. B29C 51/08 156/212 |
| 7,931,052 B2 | | 4/2011 | Schooley | |
| 2008/0236104 A1 | | 10/2008 | Howard | |

(Continued)

FOREIGN PATENT DOCUMENTS

| | | |
|---|---|---|
| CN | 200957647 Y | 10/2007 |
| CN | 102858416 A | 1/2013 |

(Continued)

OTHER PUBLICATIONS

Machine translation of DE 202004007419.*

*Primary Examiner* — Christopher T Schatz
(74) *Attorney, Agent, or Firm* — Morgan, Lewis & Bockius LLP

(57) ABSTRACT

The present invention relates to a device and a method for storing adhesive application units, with the device comprising a vacuum container (10) for hermetically accommodating at least one adhesive application unit (2), with the vacuum container (10) having: a passage (22) for evacuating the vacuum container (10), a container housing section (11) having a loading/unloading opening (12) and a closing device (13) for hermetically closing the loading/unloading opening (12).

8 Claims, 2 Drawing Sheets

(56) References Cited

U.S. PATENT DOCUMENTS

| | | | |
|---|---|---|---|
| 2011/0123359 A1* | 5/2011 | Schaaf | F04F 5/22 417/174 |
| 2012/0304595 A1* | 12/2012 | Dovner | B65D 81/2015 53/79 |
| 2014/0008374 A1* | 1/2014 | Lubart | B65D 81/2015 220/592.27 |
| 2016/0183651 A1 | 6/2016 | Tonelli | |
| 2016/0376083 A1 | 12/2016 | Sun et al. | |
| 2017/0036830 A1 | 2/2017 | Marosi et al. | |

FOREIGN PATENT DOCUMENTS

| | | |
|---|---|---|
| CN | 204391160 U | 6/2015 |
| CN | 105730885 A | 7/2016 |
| DE | 37 44 103 A1 | 7/1989 |
| DE | 3744103 A1 | 7/1989 |
| DE | 20 2004 007 419 U1 | 7/2004 |
| DE | 202004007419 U1 | 7/2004 |
| KR | 2009-0039152 | 4/2009 |
| KR | 2011-0006506 | 4/2011 |

* cited by examiner

DEVICE FOR ACCOMMODATING AN ADHESIVE APPLICATION UNIT AND METHOD

TECHNICAL FIELD

The present invention relates to a device (service station) for accommodating adhesive application units for edge banding machines such as, for example, a PUR-adhesive application unit as well a method for storing adhesive application units.

TECHNICAL BACKGROUND

Applicant has internally tested storing an adhesive application unit, in particular a PUR-adhesive application unit, in a nitrogen atmosphere during non-use, the nitrogen requiring a certain moisture purity in order to prevent a duroplastic cross-linking (hardening).

Adhesive application units are used for gluing workpiece surfaces or coating materials during the coating of surfaces. These are generally executed in the form of roller systems or application nozzle systems. During the gluing process, these are provided with an adhesive, in particular with a PUR-adhesive, which reacts with the moisture in the ambient air and/or the material to be processed (base material) and thereby hardens duroplastically. For this reason, it is necessary to hermetically screen the adhesive from air, prior to processing. Given that during the gluing of the respective surfaces, the adhesive is always in flux and is constantly applied to the surfaces, and as a rule, there are only short cycle times (short interruption of the supply of adhesive during a workpiece change), it is not necessary to additionally screen the adhesive application units.

However, after the use of the adhesive application units, the water that is present in the ambient air or in the material to be processed reacts with the adhesive, in particular the PUR-adhesive, and ensures that it hardens. If the adhesive application unit is not protected from the air humidity or used further immediately, this reaction leads to a failure of the adhesive application unit. As a rule, the rollers or nozzles as well as the supply lines must be swapped in such a case. In order to prevent this, it is known in the prior art to fill a cleaning agent into the adhesive application units, which displaces the adhesive and consequently prevents a hardening of the adhesive in the adhesive application unit. However, this process is highly time and material intensive and is therefore as a rule only performed when there are longer pauses in production.

By contrast, if the adhesive application unit is only supposed to be stored for a few days, the adhesive application unit can be stored in an environment having a low humidity. This can be realized, for example, by using inert gas (for example, nitrogen). To do so, a container in which the adhesive application unit is held for storage is filled with inert gas, by which the ambient air contained in the container and which has a location-dependent air humidity is displaced. To ensure that the container is air-tight, the container is placed slightly under overpressure. The inert gas may not hereby exceed a certain amount of moisture (air humidity).

SUBJECT MATTER OF THE INVENTION

The goal of the present invention is to provide a device for accommodating at least one adhesive application unit as well a method for storing at least one adhesive application unit in order to stop a hardening of the medium to be applied, during storage of the adhesive application unit as well as to simplify the storage of the adhesive application unit.

The object is solved by a device according to claim 1. Preferred further developments of the invention are given in the dependent claims.

One of the ideas of the present invention is to prevent a hardening of an adhesive during storage of an adhesive application unit by accommodating the adhesive application unit in a vacuum container which is placed under a vacuum.

By means of the proposed device and the proposed method it is possible, in a simple and efficient manner, to stop a hardening of the medium to be applied, during the storage. Due to the fact that only the generation of a vacuum in the vacuum container in which the adhesive application unit is stored is necessary in order to ensure that a sufficiently low amount of moisture is ensured in the vacuum container, it can be assured in a simple manner that the adhesive that is to be applied and which remains in the adhesive application unit after use does not harden. By this, the consumption mediums necessary in the prior art such as inert gas, dry air, drying cartridges and the like can be dispensed with.

According to the present invention, the device for accommodating at least one or more adhesive application units for edge banding machines which are preferably used for gluing workpieces which at least in sections consist of wood, wood materials or wood substitute materials, has a vacuum container which serves to hermetically accommodate the adhesive application unit, with the vacuum container having a passage for evacuating the vacuum container and furthermore having: a container housing section having a loading/unloading opening and a closing device for hermetically closing the loading/unloading opening.

The passage can be formed, for example, as a vacuum connection which is provided within the container housing section or on the container housing section. Furthermore, it is possible that a vacuum generation device is provided within the container housing section and the "passage" is an outlet of the vacuum generation device. Consequently, a vacuum generation device can also be arranged within or outside of the container housing section.

The storage described here within the meaning of the present invention relates to a storage (storage duration) of only a few days up to one week. Should a longer storage be required, it is better to completely clean the adhesive application units, for example, by means of a cleaning agent which is introduced into the adhesive application unit in order to displace the adhesive that is to be applied.

By means of the above-described device of the present invention, it is possible, in a simple manner, to store one or a plurality of adhesive application units without a large cleaning or maintenance effort for a few days. It is here only necessary to dismount the adhesive application unit from a processing device such as, for example, a gluing station (edge banding machine), to insert the adhesive application unit into a vacuum container of the claimed device, to hold it therein preferably in a form-fit and optionally to hold and subsequently to hermetically close the vacuum container and to place it under a pre-determined vacuum level. A sufficiently low amount of moisture in the vacuum container is guaranteed by means of the generated vacuum in the vacuum container, with which the adhesive application unit can be securely stored without the still-present adhesive that is to be applied hardening. Consequently, the stored adhesive application unit can be protected from damage by the hardened medium.

Moreover, it is advantageous if the vacuum container further has one or a plurality of holding devices for holding and optionally securing the adhesive application unit or adhesive application units in the container housing section. Thus, the adhesive application unit can be securely held or secured in the vacuum container and consequently protected from damages which could occur, in particular, during transportation of the container.

According to one embodiment of the present invention, the adhesive application unit is a PUR-adhesive application unit (PUR=polyurethane). Since polyurethane tends to harden upon contact with water, it is necessary to hermetically screen polyurethane-containing adhesives against air humidity. For this reason, the proposed device is particularly well-suited to storing adhesive application units for PUR-adhesives since it can be guaranteed in a simple manner that PUR-adhesive remaining in the adhesive application unit does not come into contact with water (air humidity) in the ambient air.

Moreover, the vacuum container can have a sealing device for hermetically sealing the loading/unloading opening.

Furthermore, it is preferred to provide a vacuum generation device which is formed in the form of a vacuum pump or a Venturi nozzle. The latter has the advantage that these are particularly inexpensive and impervious. By this, the vacuum container can be placed under a vacuum in a simple manner, i.e. the ambient air originally present in the vacuum container can be sucked out. It is only necessary for this to connect the vacuum generation device with the passage of the vacuum container which is provided in the form of a vacuum connection.

According to one preferred embodiment of the present invention, the device further comprises a vacuum monitoring device for monitoring a vacuum level in the vacuum container, with the vacuum monitoring device preferably being formed on the vacuum container.

By means of the vacuum monitoring device, a user is able to check the vacuum that is built up in the vacuum container. This is particularly advantageous with regard to a storage of several days since the vacuum present in the vacuum container can be checked at certain intervals. If necessary, the vacuum can be corrected during the storage of the vacuum container, should the vacuum container, for example, not be entirely air-tight. Therefore, if the vacuum in the vacuum container reduces during storage, it can be returned to the necessary vacuum.

Furthermore it is preferred to form the vacuum monitoring device in the form of a simple pressure gauge (manometer), in particular, in the form an electronic manometer having an alarm function.

This makes it possible to form the vacuum monitoring device by means of a standard purchased part (manometer) and further to provide the user the possibility of configuring an alarm function. Preferably, a minimal threshold value for the vacuum in the vacuum container which is higher than a necessary vacuum level ($V_{Not}$) is set, with which a sufficient moisture freedom is ensured. If the vacuum level in the vacuum container achieves the set threshold value, the vacuum monitoring device, in particular the manometer, emits a warning signal.

According to one further preferred embodiment, the vacuum in the vacuum container is set from 0.3 bar (70%) to 0.1 bar (90%), preferably 0.2 bar (80%) to 0.15 bar (85%). For example, a vacuum of 70% means here that the pressure in the vacuum container corresponds to an absolute pressure of 0.3 bar. Consequently, the vacuum generation device should be able to generate an operating pressure of −0.7 bar. Common Venturi nozzles, also called ejectors, achieve a vacuum between 70% to 85%, i.e. 0.3 bar to 0.15 bar, with a short evacuation time.

Preferably a moisture sensor for detecting an air humidity of an ambient air is further provided. Ambient air is understood to be the air which surrounds the device and particularly the adhesive application unit. Since the air humidity of the ambient air is dependent on the installation site, it is advantageous if the air humidity can be detected by means of a moisture sensor.

Furthermore, it was determined by means of a series of experiments that a maximum water content of approximately 5 ppm in the ambient air surrounding the adhesive application unit should not be exceeded, in order to securely stop a hardening of the adhesive. A water content of 5 ppm approximately corresponds to a moisture amount of 0.004 $g/m^3$. According to one further embodiment of the present invention, the vacuum generation device and the vacuum monitoring device are provided on the vacuum container in order to form the vacuum container as an autarkic apparatus for storing adhesive application units.

Since particularly in the case of a Venturi nozzle, the acquisition costs for the vacuum generation device as well as the vacuum monitoring device are low, it is possible to form a complete device according to the invention in the form of an autarkic vacuum container to which all the components of the device are attached. This offers the advantage that a separate device or installation for evacuating the vacuum container can be dispensed with and the vacuum container can be used wherever there is a pressure connection or a compressed air source.

Alternatively, the vacuum container, in particular the vacuum container having a vacuum monitoring device can be formed interchangeably and provided with a vacuum connection for building up the vacuum, with which the vacuum container is connectable to a vacuum generation device. This offers the advantage that the individual vacuum containers can be formed more cost-efficiently since a vacuum generation device can be dispensed with. However, this makes a separate device which provides the vacuum generation device necessary. This embodiment of the present invention is especially useful if the control unit which takes account of the air humidity as well as optionally the ambient temperature when determining the necessary vacuum level ($V_{Not}$) is complex and is consequently expensive. In this case, the separate device or base station can comprise the control unit, air humidity sensor, optionally the ambient temperature sensor and the vacuum generation device, with which the interchangeable (or autarkic) vacuum containers can be formed particularly easily.

The container housing section of the vacuum container is furthermore preferably equipped such that it can withstand a vacuum of 0.3 to 0.1 bar. In particular, the container housing section must be sufficiently stiffened here in order to avoid an inward bulging of a container housing wall.

According to a further embodiment, the holding device has an opening, into which the adhesive application unit can be inserted in sections. Consequently, the adhesive application unit can be securely stored in the vacuum container.

According to one further preferred variant, it is provided that the adhesive application unit is held in a form-fit, particularly a horizontal form-fit, in the holding device. This enables a very secure arrangement of the adhesive application unit in the vacuum container.

Moreover, a vertical fixing of the adhesive application unit can additionally occur by means of a fixing element, for example, by means of a rubber element. In one variant, this could be attached to an underside of a closure lid.

Furthermore, the vacuum container can be formed such that the passage and/or the vacuum generation device and/or the vacuum monitoring device are provided in a closure lid of the container housing section.

It is further advantageous if the device comprises the adhesive application unit.

Furthermore, the present invention relates to a method for storing at least one adhesive application unit for edge banding machines which are preferably used for gluing workpieces which at least in sections consist of wood, wood materials or wood substitute materials, in particular, by using the device described above, having the steps: providing an empty vacuum container, inserting at least one adhesive application unit into a container housing section of the provided vacuum container, optionally securing the held adhesive application unit in the vacuum container, in particular at the container housing section, closing the vacuum container after the adhesive application unit is held, with an air-tight seal being produced and an ambient air present in the vacuum container being sucked out to produce a vacuum in the vacuum container.

In one embodiment of the method, after the vacuum is built up in the vacuum container, it is separated from a vacuum generation device and a new, empty vacuum container is provided for a new loading with an adhesive application unit, with the vacuum preferably being 0.3 to 0.1 bar, further preferably 0.2 bar to 0.15 bar. In this case, a base station having a vacuum generation device is provided and autarkic vacuum containers are interchangeably held by it.

According to one alternative embodiment of the method, after the build-up of the vacuum in the vacuum container by means of a vacuum generation device, which is formed in the form of a Venturi nozzle, the vacuum container is disconnected from a compressed air connection or a compressed air source in order to be storable as an autarkic vacuum container, with the vacuum preferably being 0.3 to 0.1 bar, further preferably 0.2 bar to 0.15 bar. In this case, a separate base station is not necessary, each vacuum container is provided with the necessary components that are required to build up the vacuum in the vacuum container.

Preferably, the vacuum generated in the vacuum container is monitored by means of a vacuum monitoring apparatus, and a warning signal is emitted if the vacuum in the vacuum container falls below a pre-determined, necessary vacuum level ($V_{Not}$). This raises the certainty that the necessary vacuum level ($V_{Not}$) and therefore the necessary, sufficiently low amount of moisture in the vacuum container can be ensured. If the vacuum reaches a predetermined threshold value which corresponds to a higher vacuum level than the required vacuum level ($V_{Not}$) due to a leakage in the vacuum container, a warning signal is emitted. For this, the warning signal can be emitted acoustically, visually or via a control computer which monitors all of the filled vacuum containers provided.

According to one further embodiment of the method of the present invention, the necessary vacuum level ($V_{Not}$) in the vacuum container is determined based on a detected air humidity of the ambient air, with preferably a detected ambient temperature also being taken into account. As already stated above in detail, this offers the advantage that the necessary vacuum level ($V_{Not}$) can be optimally adjusted to the location-dependent environmental conditions in order to be able to ensure a sufficient vacuum level and thereby a sufficiently low amount of moisture in the vacuum container. This offers the advantage that the vacuum generated in the vacuum container can be optimally adjusted, which means that an unnecessarily strong or high vacuum in the vacuum container can be avoided. It is thereby possible to avoid unnecessary energy costs for evacuating the vacuum container.

DETAILED DESCRIPTION OF THE PREFERRED EMBODIMENTS

Preferred embodiments of the present invention are described below in detail by means of the enclosed figures. Further modifications of certain features cited in this context can each be combined with one another in order to form new embodiments.

Figure 1:
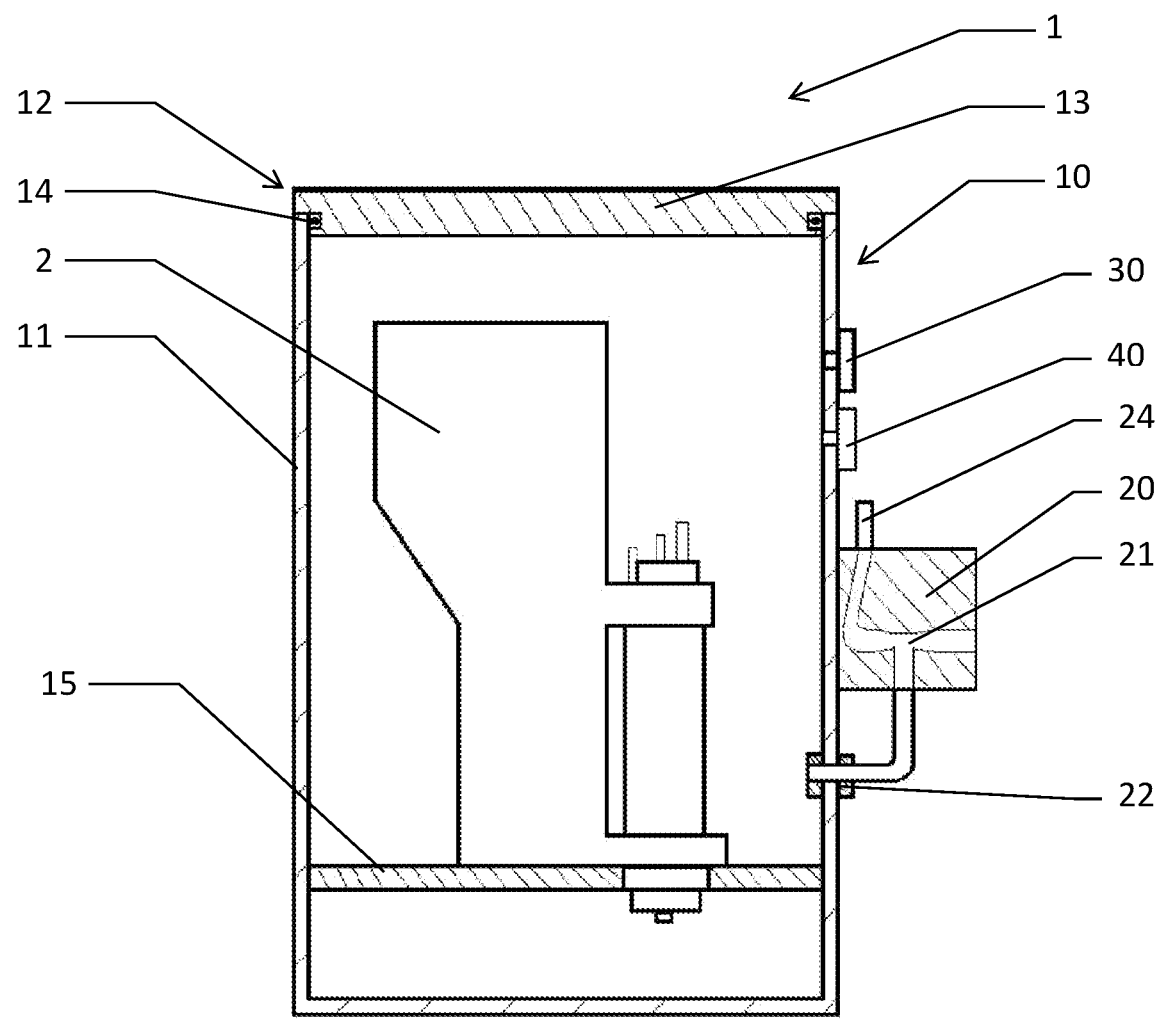
FIG. 1 shows one embodiment of the device of the present invention, in which the vacuum generation device is provided on the vacuum container.

In FIG. 1, one embodiment of a device 1 of the present invention is shown in which a vacuum connection 22 is provided on a vacuum container 10. As revealed in FIG. 1, the device of the present embodiment has a vacuum container 10 which is formed from a container housing section 11 having a loading/unloading opening 12 and a holding device 15. The vacuum connection 22 is hereby attached to an outer side of the container housing section 11.

The holding device 15 serves to hold and secure an adhesive application unit 2, with the vacuum container 11 also being able fundamentally to be configured in its dimensioning such that a plurality of adhesive application units 2 can be held. However, for handling reasons the dimensioning could be advantageous for only one adhesive application unit 2.

The adhesive application unit 2 is held in the holding device 15 preferably in a form-fit and optionally held in order to prevent unnecessary fastening devices and to simplify the holding of the adhesive application unit 2 in the vacuum container 10.

The vacuum container 10 further has a closing device 13, with which the loading/unloading opening 12 of the vacuum container 10 can be hermetically sealed. To hermetically seal the loading/unloading opening 12, the vacuum container 10 further has a sealing device 14. In the embodiment shown in FIG. 1, the loading/unloading opening 12 is formed on an upper side of the container housing section 11. Accordingly, the closing device 13 is formed in the form of a closure lid 13 having a sealing device 14 or O-ring.

In the shown embodiment, the adhesive application unit 2 is inserted into a holding plate 15 which has a holding bore therefor which horizontally fixes the adhesive application unit. The adhesive application unit 2 is also vertically fixed due to its own weight. If desired, a vertical fixing of the adhesive application unit 2 can additionally occur by means of a fixing element, for example, in the form of a rubber element which is attached to an underside of the closure lid 13.

After inserting the adhesive application unit 2 into the vacuum container 10 and placing the closure lid 13 on the vacuum container 10, this can be secured to the vacuum container, for example, by means of tension levers, and the air-tight seal can be ensured by means of the sealing device 14. The adhesive application unit 2 for edge banding machines is used for gluing workpieces which, for example, consist at least in sections of wood, wood materials or wood substitute materials, and to this end has common roller systems or application nozzle systems.

Even if the loading/unloading opening 12 is provided on the upper side of the container housing section 11 in the present embodiment by way of example, it can also be provided on a side wall or peripheral wall of the container housing section 11. Furthermore, in contrast to the embodiment shown in FIG. 1, the vacuum container 10 can also be carried out in the form of a cover (bell jar).

The vacuum connection 22 can furthermore be formed as a check valve 22 which allows an exchange of air between the interior of the vacuum container 10 and the ambient air in the outward direction, which however, stops a backflow of air into the vacuum chamber 10. However, as a rule, a control valve 22 is used with the de-aeration/aeration and locking positions. An outlet of the check valve 22 or the control valve 22 (vacuum connection) is directly connected to an inlet of a vacuum generation device 20 which, in the shown embodiment, is formed in the form of a Venturi nozzle 21 and is attached to the outer side of the vacuum container 10. Furthermore, the Venturi nozzle is provided with an air connection 24 which in turn can be connected to a compressed air source or a compressed air supply. The compressed air provided by the compressed air source or the compressed air supply provides the necessary flowing air (driving power) for the Venturi nozzle 21 by means of which the air (ambient air) present in the hermetically sealed vacuum container can be sucked out through the check valve 22 or the control valve 22 (vacuum connection).

The vacuum container 10 further has a vacuum monitoring apparatus 30 in the form of a pressure manometer by means of which the vacuum in the vacuum container 10 generated by means of the Venturi nozzle 21 can be monitored. If the vacuum in the vacuum container 10 reaches a pre-determined necessary vacuum ($V_{Not}$), the Venturi nozzle 21 can be disconnected from the compressed air source. In order to be able to build up the vacuum in the vacuum container 10 again later and to be able to open the closure lid 13, the vacuum container 10 can further be provided with a vent valve. This is particularly necessary if a check valve 22, and not a control valve 22, is used.

In contrast to the embodiment shown in FIG. 1, the passage 22 (vacuum connection 22) and/or the vacuum generation device 20 and/or the vacuum monitoring apparatus 30 can also be provided in the closure lid 13 or in a cover (bell jar).

As the embodiment shown in FIG. 1 shows, the vacuum container 10 can be provided with a moisture sensor 40 by means of which the air humidity in the closed vacuum container 10 is detectable. Furthermore, if desired, the vacuum container 10 can be provided with a temperature sensor in order to detect the temperature of the ambient air.

Figure 2:
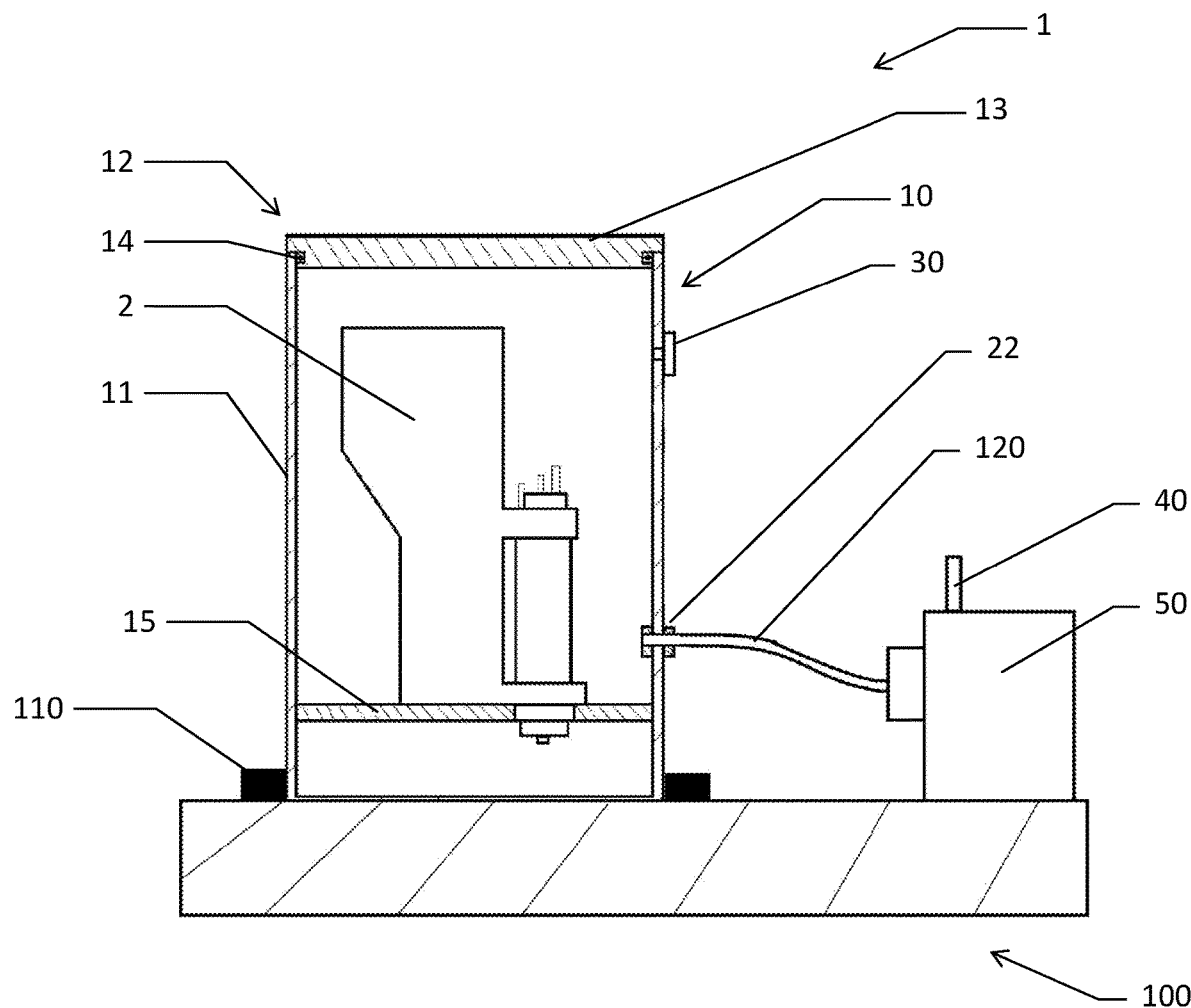
FIG. 2 shows one alternative embodiment of the device of the present invention, in which a base station is provided in which autarkic vacuum containers can be placed and evacuated.

An alternative embodiment of the device 1 according to the present invention is shown in FIG. 2. The device shown here generally corresponds to the configuration of the device shown in FIG. 1. Identical or equivalent components are provided with the same reference number.

The embodiment shown here differs from the embodiment shown in FIG. 1 in that not all components of the device are provided on the vacuum container, but rather, a base station 100 is provided instead. The base station 100 provides a holding device 110 for the vacuum container 10 as well a vacuum generation device 50. Furthermore, in contrast to the embodiment example of FIG. 1, the base station 100 can also comprise the moisture sensor 40 as well as optionally the temperature sensor.

The vacuum generation device 50 of the base station 100 can be simply connected by means of a flexible air hose 120 to the check valve 22 or control valve 22 (vacuum connection) which functions as a suction connection in this case. In this manner, a higher-quality control technology and suction technology (for example, a vacuum pump) can be used and the individual vacuum containers 10 can be designed more easily and consequently more cost-efficiently. This embodiment is especially useful if a large amount of vacuum containers is required.

The invention claimed is:

1. A device (1) for accommodating at least one adhesive application unit (2) for edge banding machines, comprising: at least one adhesive application unit (2) which is part of an edge banding machine, said adhesive application unit comprising a roller system or nozzle application system configured to apply adhesive; a vacuum container (10) for hermetically accommodating the adhesive application unit (2), wherein the vacuum container (10) comprises a passage (22) for evacuating the vacuum container (10) and further comprises: a container housing section (11) having a loading/unloading opening (12), a closing device (13) for hermetically closing the loading/unloading opening (12); and a holding device (15) configured to hold and optionally securing the adhesive application unit (2) in the container housing section (11), a vacuum generation device (20) which is formed as a venturi nozzle (21), said vacuum generation device (20) being connected to the passage (22), a compressed air connection for connecting the vacuum generation device (20) to a compressed air source, and a vacuum monitoring device (30) comprising a manometer provided on the vacuum container (10) for measuring pressure in the vacuum container (10), wherein the pressure measurement is used for monitoring a vacuum level in the vacuum container (10), wherein the vacuum level in the vacuum container (10) is adjustable from 0.3 bar to 0.1 bar.

2. The device according to claim 1, wherein the adhesive application unit is a PUR-adhesive application unit.

3. The device according to claim 1, further comprising a sealing device for hermetically sealing the loading/unloading opening.

4. The device according to claim 1, wherein the passage on or in the container housing section comprises a vacuum connection.

5. The device according to claim I, wherein the vacuum generation device and the vacuum monitoring device are provided on the vacuum container in order to form the vacuum container as an integrated device for storing the adhesive application unit.

6. The device according to claim 1, wherein the holding device has an opening into which the adhesive application unit can be inserted in sections, wherein the adhesive application unit can be held in the holding device in a form-fit.

7. The device according to claim 1, wherein the passage and/or the vacuum monitoring device are provided in a closure lid of the container housing section.

8. The device according to claim 1, wherein the manometer has an alarm function.

* * * * *